Dec. 21, 1965 V. A. ZIKE 3,224,657
BLIND ANVIL FASTENING DEVICE
Filed May 31, 1962 9 Sheets-Sheet 1
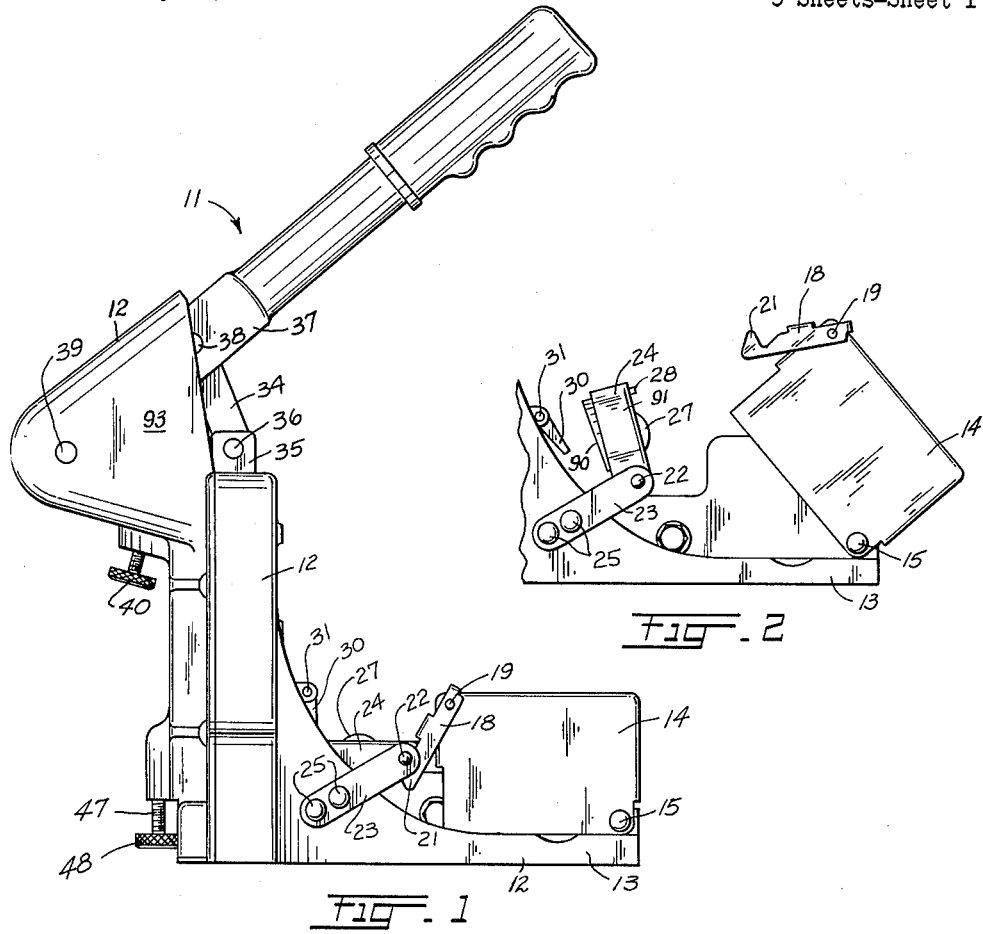
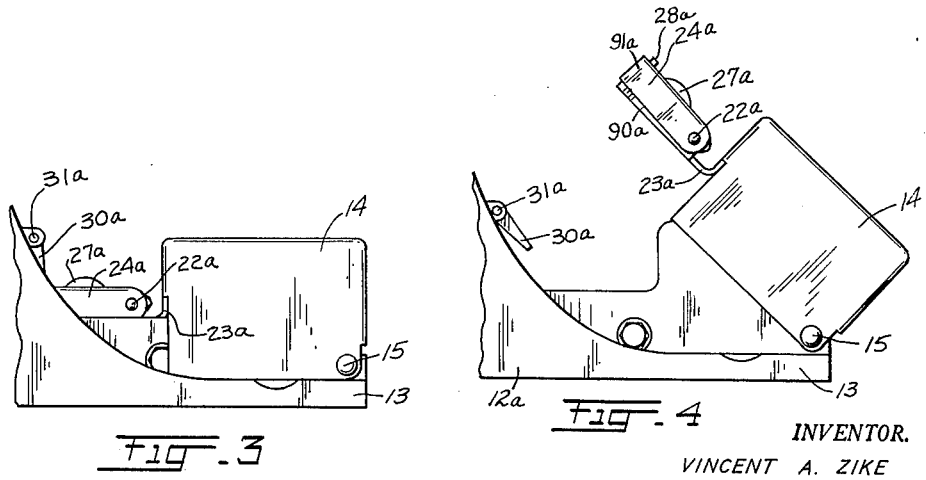
INVENTOR.
VINCENT A. ZIKE
BY J. Walton Bader
ATTORNEY Dec. 21, 1965          V. A. ZIKE          3,224,657
BLIND ANVIL FASTENING DEVICE
Filed May 31, 1962          9 Sheets-Sheet 2
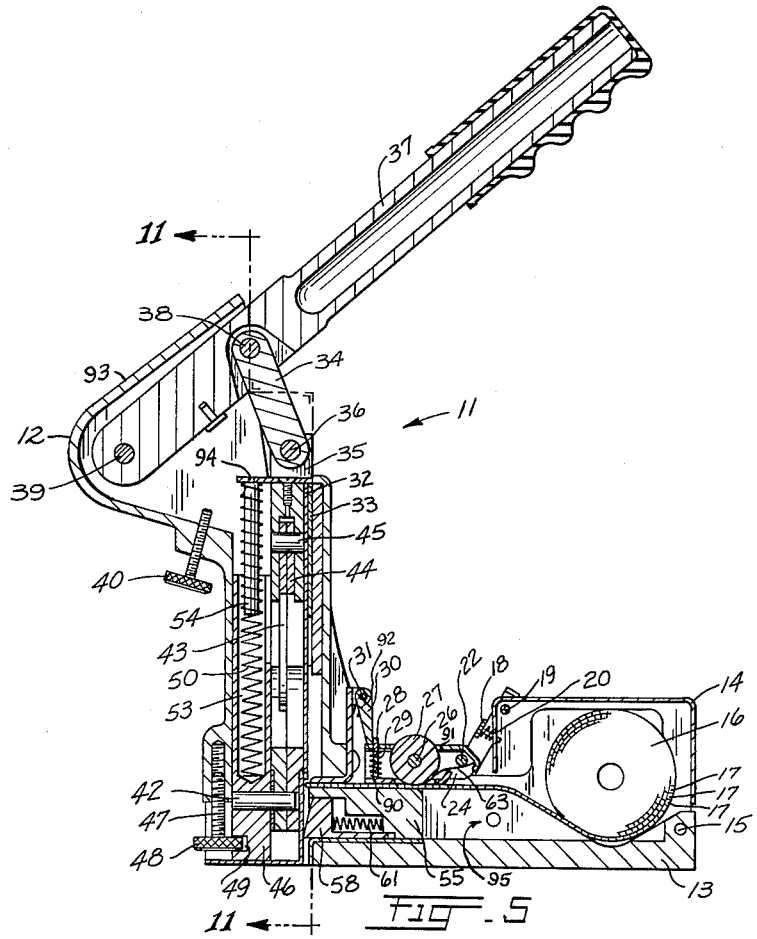
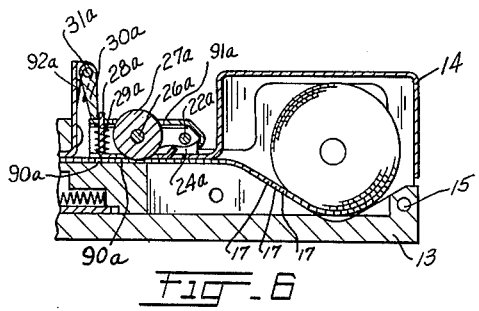
INVENTOR.
VINCENT A. ZIKE
BY J. Walton Bade
ATTORNEY

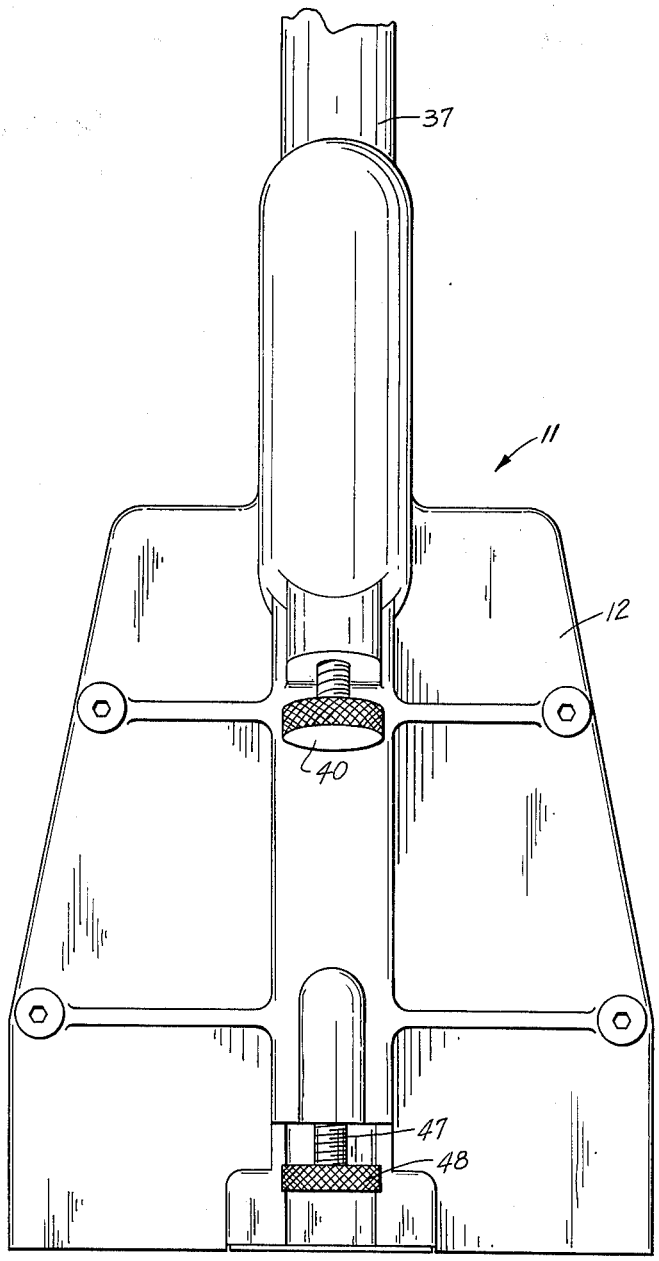

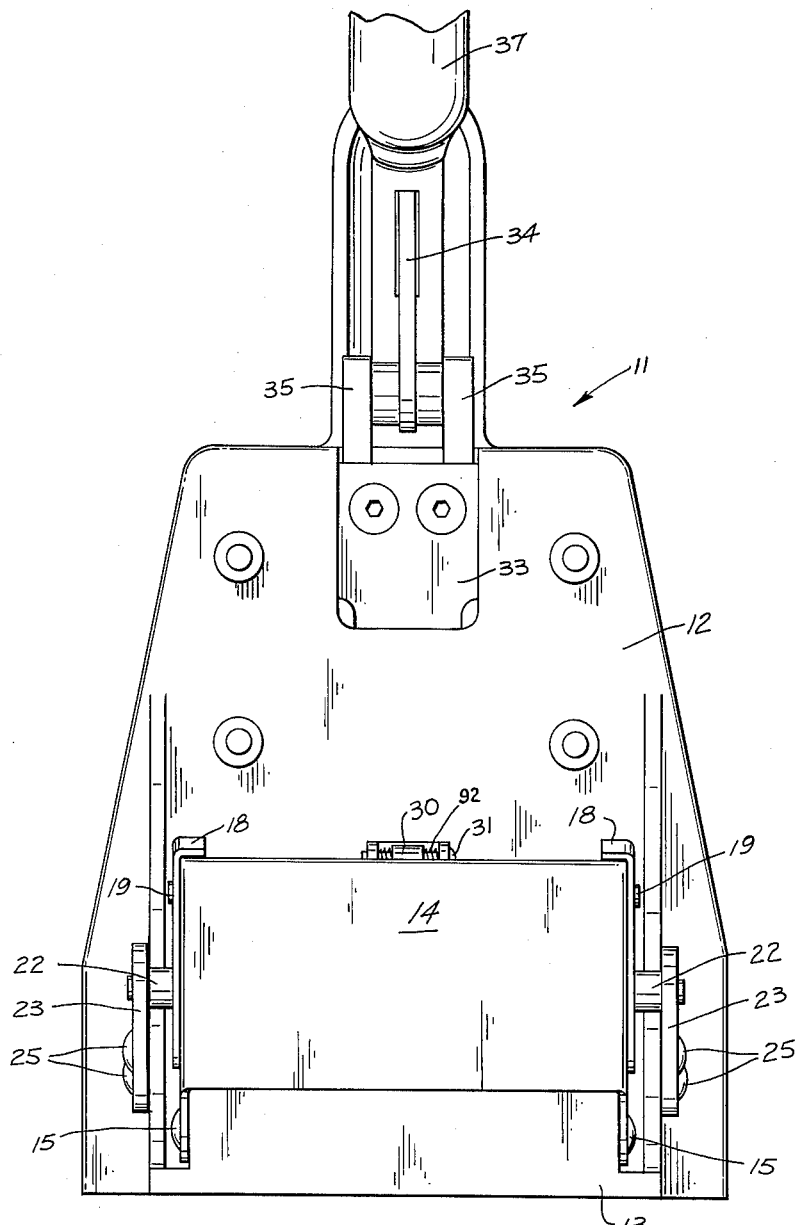

Dec. 21, 1965

V. A. ZIKE 3,224,657

BLIND ANVIL FASTENING DEVICE

Filed May 31, 1962

INVENTOR.
VINCENT A. ZIKE

BY J. Walton Bader

ATTORNEY

Dec. 21, 1965 V. A. ZIKE 3,224,657
BLIND ANVIL FASTENING DEVICE
Filed May 31, 1962 9 Sheets-Sheet 6

INVENTOR.
VINCENT A. ZIKE
BY
J. Walton Bade
ATTORNEY

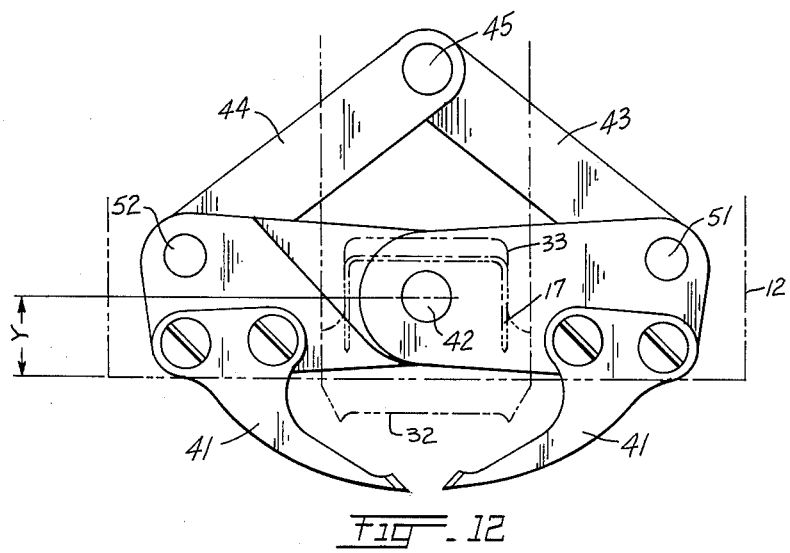
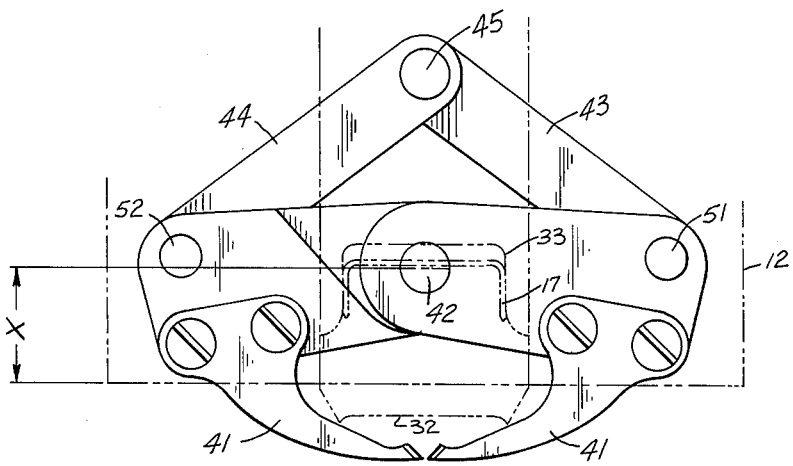

Dec. 21, 1965 V. A. ZIKE 3,224,657
BLIND ANVIL FASTENING DEVICE
Filed May 31, 1962 9 Sheets-Sheet 9
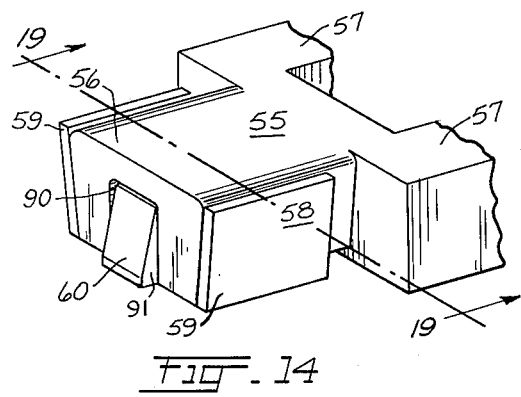
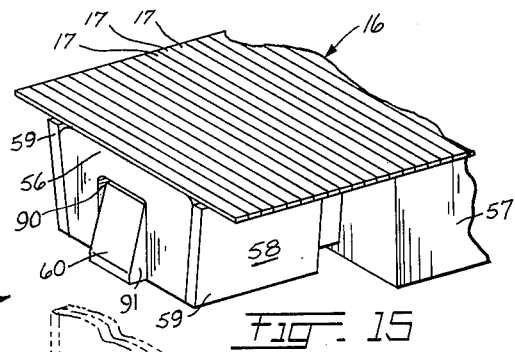
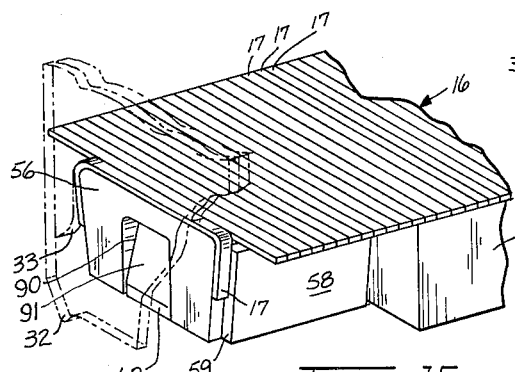
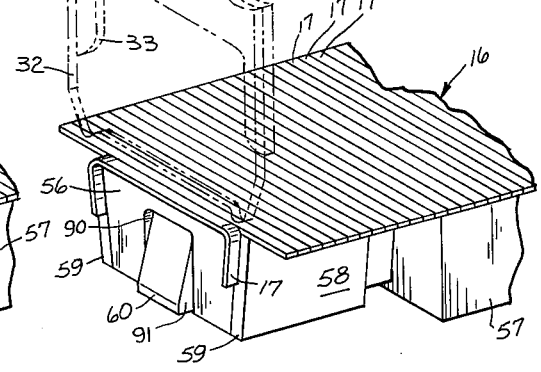
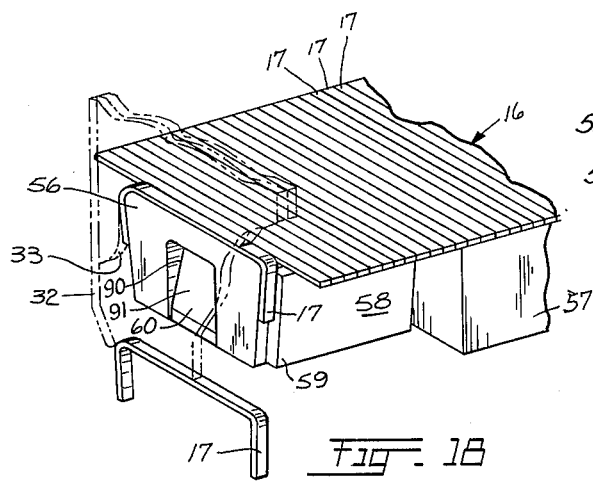
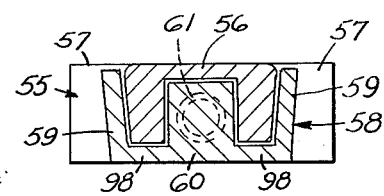
INVENTOR.
VINCENT A. ZIKE
BY J. Walter Bader
ATTORNEY

United States Patent Office 3,224,657
Patented Dec. 21, 1965

3,224,657
BLIND ANVIL FASTENING DEVICE
Vincent A. Zike, Elmhurst, N.Y., assignor to Speedfast Corporation, Long Island City, N.Y., a corporation of New York
Filed May 31, 1962, Ser. No. 198,998
8 Claims. (Cl. 227—88)

This invention relates to a blind anvil fastening device. It has particular application to devices which are used for carton closing and the like.

Fastening devices of the instant type are broadly conventional and generally consist of a magazine having a plurality of staples therewithin in aligned relationship, a driver blade adapted to contact the leading staple in the magazine, some type of follower within the magazine to properly position the staples, and a plurality of blind clenching members. Devices of the instant type may be actuated manually, hydraulically, or pneumatically.

It is also conventional, since the issuance of the patent to Hershey Lerner, which is United States Patent No. 2,743,445, issued May 1, 1956, to increase the number of staple elements which may be disposed at one time within a magazine, by placing a large number of fastener elements in interconnected laterally aligned relationship in the form of a belt, forming the leading element of the belt into a staple, and then driving the formed staple into the work.

The instant invention discloses an apparatus which may be profitably employed to accomplish blind clenching of fasteners and which will utilize a belt of interconnected laterally aligned fastener elements for the fasteners employed in this apparatus.

The instant invention also includes feed mechanism to permit automatic feeding of successive fastener elements and driving of the same as well as specific depth penetration adjustment mechanism. The above specific mechanisms may have utilization apart from the specific fastening device disclosed in this invention and are therefore separately and specifically claimed.

Mere inspection of the construction of the instant invention clearly shows the advantages thereof. However some of the features which applicant believes are particularly advantageous will be set forth seriatim without limiting, in any way, the scope of the instant invention.

(1) The feed mechanism of the fastening device of instant invention includes simple and highly effective cam means which are positively actuated by movement of the driving means of the fastening device.

(2) Simple means are provided for interposing a formed fastener ahead of the cam means when the cam means are in retracted position so that the cam means can feed a fastener into proper driving position.

(3) Depth penetration adjustment means are provided which include a slide member and a fulcrum pin so that both fastener blind clenching members can be simultaneously adjusted.

(4) A device is produced which is relatively simple to manufacture and is simple and fool-proof in operation.

In applicant's opinion the device of this invention can be briefly described, in its broadest aspect, as comprising a stapling device for blind clenching of fasteners which contains various structure including feed mechanism and depth penetration adjustment mechanism.

The feed mechanism itself may be briefly described as comprising cam means movable in one direction by the action of the driving means, means normally urging the cam means in the opposite direction, and means for interposing a fastener element in advance of the cam means when the cam is moved against the pressure of the urging means.

The depth penetration adjustment means may be briefly described as comprising a slide member, a fulcrum pin fixed within the slide member, means for adjusting the slide member upwardly or downwardly, a pair of fastener blind clenching members about the fulcrum pin, and pivotal linkage actuating the fastener blind clenching members.

The invention will be further described by reference to the accompanying drawings which form a part of this specification and represent the best modes known to the inventor of carrying out the instant invention. In this connection, however, the reader is cautioned to note that the specific forms of the invention shown herein are for illustrative purposes and for purposes of example only. Various changes and modifications may obviously be made within the spirit and scope of this invention.

FIG. 1 is a side elevational view of the principal form of a fastening device for blind clenching of fasteners made in accordance with this invention. The fastener blind clenching members are shown in retracted position.

FIG. 2 is a partial side elevational view of the magazine portion of the form of device shown in FIG. 1 with the magazine cover illustrated in open position.

FIG. 3 is a partial side elevational view of the magazine portion of an alternative form of device made in accordance with this invention, with the cover of the magazine shown in closed position.

FIG. 4 is a view similar to that of FIG. 3 but showing the magazine in open position.

FIG. 5 is a sectional side elevational view of the form of the invention shown in FIG. 1 with the fastener blind clenching members shown in retracted position.

FIG. 6 is a fragmentary sectional side elevational view of the magazine portion of the alternative form of the device. The cover of the magazine is shown in closed position.

FIG. 7 is a front elevational view of the principal form of device made in accordance with this invention with the fastener blind clenching members shown in retracted position.

FIG. 8 is a rear elevational view of the principal form of device made in accordance with this invention with the fastener blind clenching members shown in retracted position.

FIG. 12 is a detail front view of the fastener blind clenching members and associated structure made in accordance with this invention showing the adjustment made when long staples are used.

FIG. 13 is a view similar to FIG. 12 but showing the adjustment when short staples are used.

FIG. 14 is an isometric view of the former block and cam portions of the feed mechanism of this invention.

FIG. 15 is an isometric view of the former block and cam portions of the feed mechanism of this invention with a plurality of aligned fastener elements in position for operation.

FIG. 16 is a view similar to that of FIG. 15 but showing the position of the parts when the driver blade has driven a staple home and the former blade has formed the next succeeding staple.

Figure 9:
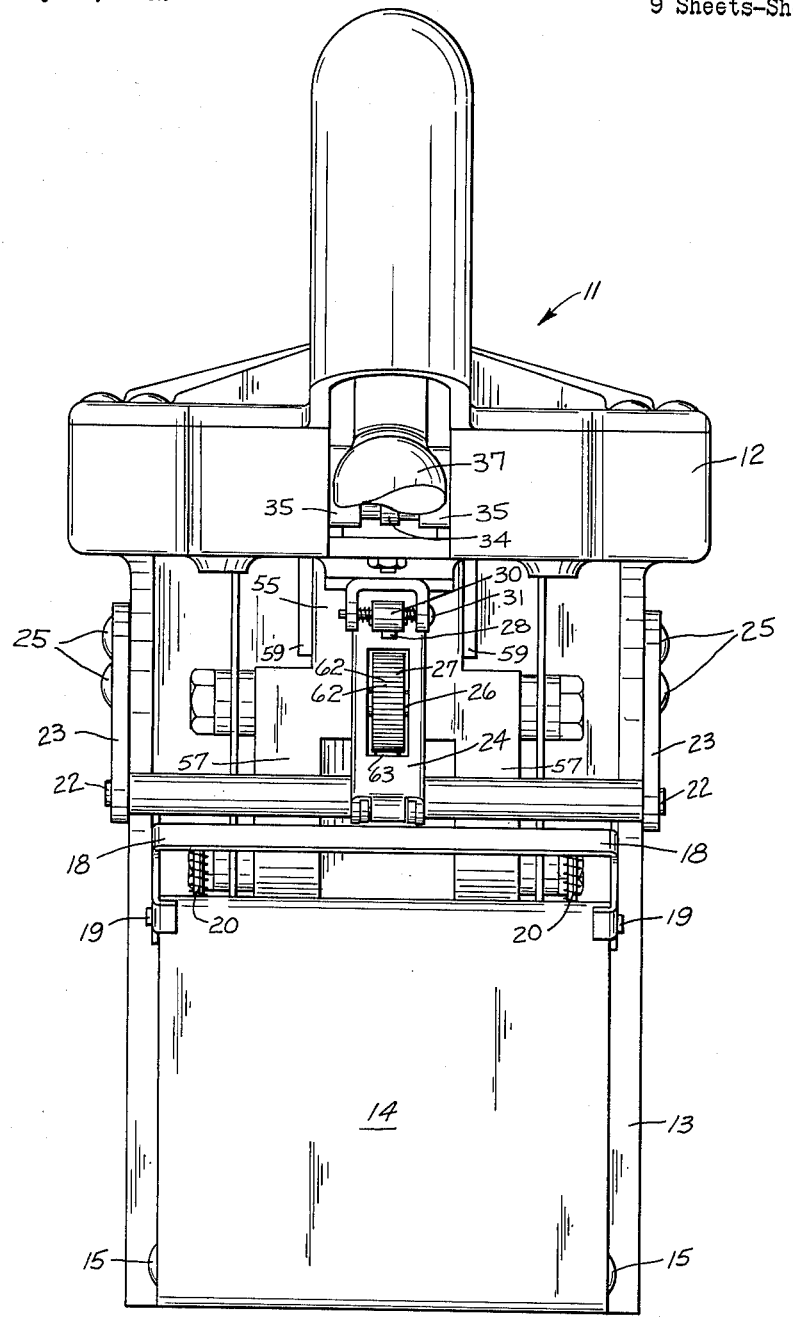
FIG. 9 is a top plan view of the principal form of device made in accordance with this invention, with the cover of the magazine in closed position.

I claim:
1. Feed mechanism for a fastening device utilizing a plurality of interconnected fastener blanks and having forming and driving means thereupon, comprising a former block having front and rear portions and provided with an opening therewithin, a cam retractably movable by the action of said driving means, said cam having lateral portions thereupon normally straddling and laterally aligned with the front portion of said former block but disposed rearwardly thereof when said cam is moved retractably, said cam also having a portion within said opening, spring means normally urging said cam extendably, said forming means forming leg portions upon a fastener blank while said blank is connected to the remaining blanks, said formed legs being interposed in advance of said lateral portions of said cam when said cam is in a rearward position, said cam being thence released so that said formed staple pulls the remainder of fastener blanks forwardly.

2. Feed mechanism for a fastening device utilizing a plurality of substantially linear interconnected fastener elements having driving means and forming means behind said driving means, said feed mechanism comprising a former block substantially rectangular in cross-section having a leading portion and provided with an opening therewithin, a cam having an outwardly tapering and projecting forward portion retractably movable by impingement of said driving means thereupon, said cam having a portion within said opening and also having lateral portions thereupon normally straddling the leading portion of said former block but disposed rearwardly thereof when said cam is moved retractably, spring means connected with said cam normally urging said cam extendably, said driving means also adapted to sever the leading fastener blank from the others and said forming means adapted to form the next succeeding fastener blank into a staple element having crown and leg portions about said former block while retaining said crown in interconnected relationship with the next succeeding fastener element and to interpose the legs of said formed staple in advance of the lateral portions of said cam when said cam is moved retractably against the pressure of said spring means, said cam moving said blanks forwardly when the pressure of said driving means is released therefrom.

3. Feed mechanism for a fastening device utilizing a belt of substantially linear interconnected fastener elements, said fastening device also having driving means and forming means trailing said driving means, said feed mechanism comprising a former block substantially rectangular in cross-section having a leading portion thereupon and provided with an opening therewithin, a wheel member normally holding a plurality of said fastener elements against said former block, said wheel member being also upwardly movable, cam having an outwardly tapering and forwardly extending leading portion retractably movable by impingement of said driving means thereupon, said cam having a portion within said opening and also having lateral portions thereupon normally straddling and laterally aligned with the leading portion of said former block but disposed rearwardly thereof when said cam is moved rearwardly, spring means normally urging said cam extendably, said driving means adapted to sever the leading fastener element from said belt and said forming means adapted to form the next succeeding fastener element into a staple element having crown and leg portions about said former block while retaining said crown in interconnected relationship with the remainder of said fastener elements and to interpose the legs of said formed staple in advance of the lateral portions of said cam when said cam is moved retractably against the pressure of said spring means, said cam also moving said plurality of fastener blanks forwardly when the pressure of said driving means is released therefrom.

4. A stapling device for blind stapling comprising a housing, a magazine for a plurality of interconnected fastener elements adjacent said housing, an openable cover about said magazine, a driver blade and a former blade secured above and trailing said driver blade disposed within said housing, a pivotally movable handle adjacent said former and driver blades, a pivoted link joining said handle to said blades, spring means normally holding said blades in fully retracted position, a former block substantially rectangular in cross section provided with an opening therewithin and having leading and trailing portions disposed adjacent said magazine, and a cam having an outwardly tapering and projecting leading portion retractably movable by impingement of said driver blade thereupon, said cam having a portion within said opening and also having lateral portions thereupon normally straddling and laterally aligned with leading portion of said former block but disposed rearwardly thereof when said cam is retracted, spring means normally urging said cam extendably, and a pair of pivotally movable fastener blind clenching members operatively connected with said driver blade, said driver blade adapted to sever the leading fastener element from the plurality of fastener elements and place said clenching members in position about said leading fastener element, and said former blade adapted to form the next succeeding fastener blank into a staple element having crown and leg portions about said former block while retaining said crown in interconnected relationship with the remainder of said fastener elements and to interpose the legs of said formed staple in advance of the lateral portions of said cam when said cam is moved retractably against the pressure of said spring means, said cam moving said blanks forwardly when the pressure of said driving means is removed therefrom.

5. A stapling device for blind stapling comprising a housing, a magazine adapted to hold a flexible belt of a plurality of laterally interconnected fastener elements adjacent said housing, an openable cover about said magazine, a driver blade and a former blade secured above and behind said driver blade and disposed within said housing, a pivotally movable handle adjacent said former and driver blades, a pivoted link joining said handle with said blades, spring means normally holding said blades in fully retracted position, a former block adjacent said magazine substantially rectangular in cross section provided with an opening therewithin and having leading and trailing portions, a wheel member normally holding a portion of said flexible belt against said former block, said wheel member being also upwardly movable, cam having an outwardly tapering leading portion retractably movable by impingement of said driver blade thereupon, said cam having a portion within sad opening and also having lateral portions thereupon normally straddling and laterally aligned with the leading portion of said former block but disposed rearwardly of said portion when said cam is retracted, spring means normally urging said cam extendably, a slide vertically movable within said housing provided with a slot therewithin, means for adjusting said slide member upwardly or downwardly, a fulcrum pin fixed within said slide, a pair of fastener blind clenching members about said fulcrum pin, bifurcated pivotal linkage actuating said fastener blind clenching members, said driver blade adapted to sever the leading fastener element from the belt of fastener elements and place said clenching members in position about said leading fastener element, said former blade adapted to form the next succeeding fastener blank into a staple element having crown and leg portions about said former block while retaining said crown in interconnected relationship with the remainder of said fastener blanks and to interpose the legs of said formed staple in advance of the lateral portions of said cam when said cam is moved retractably against the pressure of said urging means, said cam moving said blanks forwardly when the pressure of said driving means is released therefrom.

6. Feed mechanism for a fastening device utilizing a belt of substantially linear interconnected fastener elements, said fastening device also having driving means and forming means behind said driving means, comprising a former block substantially rectangular in cross section provided with an opening therewithin, a wheel member normally holding a plurality of said fastener elements against said former block, a retractably movable cam about said former block having a portion within said opening and also having lateral portions thereupon normally straddling and laterally aligned with leading portion of said former block but disposed rearwardly thereof when said cam is retracted, said cam also having a projecting outwardly tapering portion movable by impingement of said driving means thereupon, spring means normally urging said cam extendably, said driving means adapted to sever the leading fastener element from said belt and said forming means adapted to form the next succeeding fastener blank into a staple element having crown and leg portions about said former block while retaining said crown in interconnected relationship with the remainder of said fastener blanks and to interpose the legs of said formed staple in advance of said cam when said cam is moved retractably against the pressure of said spring means, said cam moving said blanks forwardly when the pressure of said driving means is released therefrom.

7. Depth penetration adjustment means for a fastening device, said means comprising a housing, a slide vertically movable within said housing provided with a vertical recess and with a substantially horizontal slot, a screw carried by said housing having a head partially disposed within said slot, a coiled spring within said vertical recess, a manually operated actuating mechanism having a portion abutting said spring and a downwardly depending portion extending from said abutting portion within said coil spring, a fulcrum pin fixed to said slide, a pair of fastener blind clenching members pivoted on said fulcrum pin, and bifurcated pivotal linkage connected to said actuating mechanism, and to said fastener blind clenching members whereby rotation of said screw will control the depth of said clenching members by vertical movement of said slide.

8. Depth penetration adjustment means for a fastening device comprising a housing, a slide vertically movable within said housing provided with a vertical recess and a slot, a screw carried by said housing having a head partially disposed within said slot, a spring within said vertical recess, a fulcrum pin fixed to said slide, a pair of fastener blind clenching members pivoted to said fulcrum pin, and actuating mechanism including a control handle and bifurcated pivotal linkage connected to said fastener blind clenching members whereby manual rotation of said screw will control the depth of said clenching members by movement of said slide.

References Cited by the Examiner

UNITED STATES PATENTS

| | | | |
|---|---|---|---|
| 572,420 | 12/1896 | Greenfield | 1—378 |
| 1,442,857 | 1/1923 | Claussen et al. | 1—378 |
| 2,722,001 | 11/1955 | Schafroth | 1—406 |
| 2,897,502 | 8/1959 | Schafroth | 1—406 |
| 2,987,725 | 6/1961 | Heilman | 1—365 |
| 3,029,436 | 4/1962 | Kufel et al. | 1—406 |

FOREIGN PATENTS 788,632   1/1958   Great Britain.

GRANVILLE Y. CUSTER, JR., *Primary Examiner.*

UNITED STATES PATENT OFFICE
Certificate of Correction

Patent No. 3,224,657　　　　　　　　　　　　　　　　　　　　　December 21, 1965

Vincent A. Zike

It is hereby certified that error appears in the above numbered patent requiring correction and that the said Letters Patent should read as corrected below.

Column 2, after line 70, insert the following:

FIG. 17 is a view similar to that of FIG. 16 but showing the position of the parts when the driver blade has been fully retracted.

FIG. 18 is a view similar to that of FIG. 16 but including the driven staple.

FIG. 19 is a sectional view taken along lines 19—19 of FIG. 14.

The invention will now be further described by reference to the specific forms of the invention set forth in the drawings herein. In the specific description the principal form of the invention shown in FIGS. 1, 2, 5, 7, 8, 9, 10, 11, 12, 13, 14, 15, 16, 17, 18, and 19 will be used, since the only difference between this form and the form shown in FIGS. 3 and 4 is the positioning of the rotatable wheel member. However the alternative form of the invention will be fully described.

The fastening device 11, containing the invention described herein, is formed with a housing 12 having a magazine portion 13. A pivotally movable cover 14 is hingedly secured in position upon magazine portion 13 by pin 15. A flexible belt 16 consisting of a plurality of laterally interconnected fastener blanks 17 is disposed within magazine portion 13 and partially projects therefrom. A latch 18 is pivotally secured to cover 14 by pin 19 and bears spring 20 (FIG. 5) normally holding latch 18 in spaced relationship and away from cover 14. Latch 18 is also provided with hook portion 21 at one end thereof which is adapted to engage an intermediate portion of pin 22.

A fixed support 23 is secured to housing 12 by two spaced pins 25, and pin 22 joins movable support 24 to support 23 so that support 24 can pivot about support 23. Support 24 is formed with a base portion 90 and an upper portion 91. Portions 90 and 91 are pivotally connected to one another by pin 22 (FIG. 5). A wheel 27 is rotatably secured upon shaft 26. The ends of shaft 26 are retained within the opposite side portion of upper portion 91. Wheel 27, in its operative position, lies upon a plurality of fastener elements 17 (FIG. 5).

An upwardly disposed finger 28 is provided upon base portion 90 and a spring 29 is disposed and retained upon finger 28. As seen by the arrangement of parts spring 29 would normally bias upper portion 91 of support 24 to move upwardly but this tendency is checked by lock member 30 which normally lies on top of support 24 and holds this support in engaged position. Also, by reason of the pressure of spring 29, upon portions 90 and 91 of support 24 the base portion 90 of support 24, in engaged position, bears downwardly against the plurality of fastener blanks 17. Lock 30 is normally urged outwardly in the position shown in FIG. 5 by spring 92 (FIGS. 5 and 8) but can also be pivotally moved away from its normal position against the pressure of spring 92 about pin 31.

In the alternate structure shown in FIGS. 3, 4 and 6 the fixed support 23a is connected to cover 14. Pin 22a pivotally joins support 24a to support 23a. Support 24a is formed with a base portion 90a and an upper portion 91a. Wheel 27a is rotatably disposed upon shaft 26a. The ends of shaft 26a are retained within the opposite side portions of upper portion 91a. Wheel 27a is rotatably disposed upon shaft 26a. The ends of shaft 26a are retained within the opposite side portions of upper portion 91a. Wheel 27a, in its operative position, lies upon An upwardly disposed finger 28a is provided and a spring 29a is disposed and retained upon finger 28a. As in the principal form of the structure shown spring 29a would normally cause upper portion 91a of support 24a to move upwardly but this tendency is checked by lock member 30a which lies on top of support 24a and holds this support in engaged position. Lock 30a is normally urged into the position shown in FIG. 6 by spring 92a but can also be pivotally moved away from its normal position against spring pressure about pin 31a.

A driver blade 32 is reciprocatingly disposed within housing 12 and a former blade 33 is disposed behind driver blade 32. A link 34 is secured to operating plunger 35 by pin 36 and to handle 37 by pin 38. Handle 37 is also pivotally connected about and through pin 39 which also passes through housing 12 to which magazine 13 is secured and a depth degree of clinch can be controlled by screw 40 which can be selectively positioned so as to control the degree of driver of handle 37.

Fastener blind clenching members 41 are pivotally movable about fulcrum pin 42 which is fixedly disposed within slide 46. Slide 46 is movable upwardly and downwardly by means of screw 47 which has head 48 thereupon disposed within opening 49 in slide 46. Clenching members 41 are also pivotally secured to linkage members 43 and 44 by means of pins 51 and 52. Linkage members 43 and 44 are also secured to downwardly movable pin 45. Pin 45 is downwardly movable through operating plunger 35 as shown in FIG. 5.

Spring 50 is disposed within channel 53 which is provided within slide 46 and bears against support 94 to which plunger 54 is secured thus causing handle 37 to return to fully retracted position when the pressure thereupon is released.

Former block 55 is formed with an opening 90 therewithin, a leading portion 56 and a controlling portion 57. A cam 58 is disposed about former block 55 and is formed with a portion 91 within opening 90 and with lateral portions 59 straddling former block 55. Portion 91 of cam 58 also has a projecting outwardly tapering portion 60 thereupon. Portion 60 is connected to portions 59 by integral bridge portion 98. Portions 59 of cam 58 normally straddle leading portion 56 of former block 55 but are spaced rearwardly therefrom when cam 58 is retracted. A spring 61 normally urges cam 58 into extended position.

With the foregoing specific description of parts the operation of this invention can now be explained.

The device is prepared for operation by opening cover 14 of magazine 13 and depositing a fastener belt 16 in position therein. The forward fastener blanks 17 of belt 16 are then manually pulled forward to the position of wheel 27 and cover 14 is then closed. Lock member 30 is then locked into the position shown in FIG. 5 by allowing spring 92 to move member 30 in the extended position shown therein.

The operator then, based upon the conditions that he may encounter, will adjust screw 40 for type of clinch desired (which will depend upon the work to be done and the size of fastener used), and will adjust the depth of penetration by moving screw 47 which will move slide 46 upwardly or downwardly and thus will adjust the position of the fulcrum pin 42. As shown in FIGS. 12 and 13 of the drawings the movement of slide 46 will cause spacing *x* with respect to the bottom of the device and thus will adjust the position of the fulcrum pin 42.

Having made his adjustments the operator will then place the fastening device in contact with the work and will move handle 37 downwardly against the pressure of spring 50. As driver blade 32 moves downwardly it will push against portion 60 of cam 58 and will push cam 58 into retracted position against the tension of spring 61. As cam 58 is retracted former blade 33 contacts a fastener blank and forms the end portions thereof about portion 56 of former block 55 thereby producing a formed staple.

As driver blade 32 is then moved upwardly aided by the pressure of spring 50, it carries former blade 33 with it. The assembly of driver blade 32 and former blade 33 is then clear of the forward portion of cam 58 thus allowing cam 58 to move forwardly. Spring 61 now pushes cam 58 into its normal extended position but, since the leading fastener is now in the way, the side of cam 58 pushes this fastener into the position shown in FIG. 17. Since the leading fastener is also secured to the belt the action involved also pulls the belt with the fastener.

Figure 10:
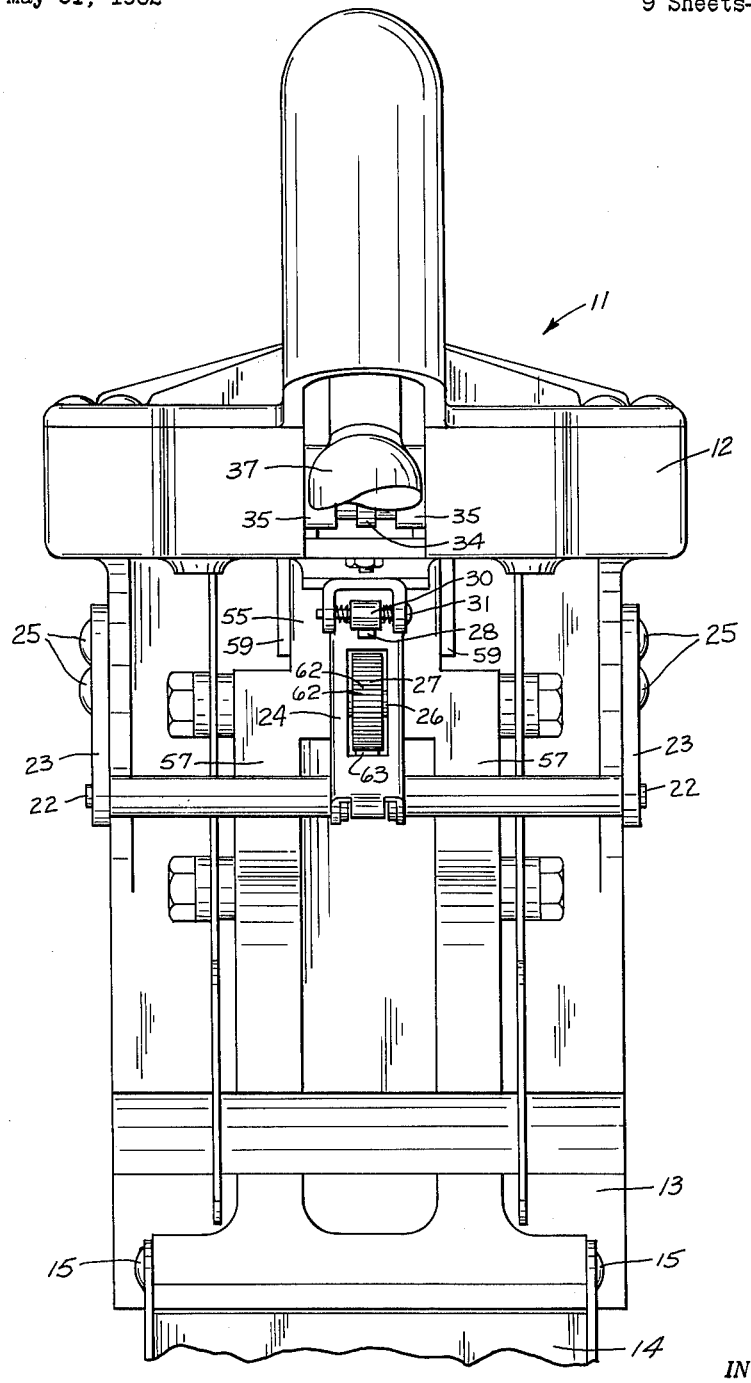
FIG. 10 is a view similar to that of FIG. 9 but with the cover of the magazine in open position.
Figure 11:
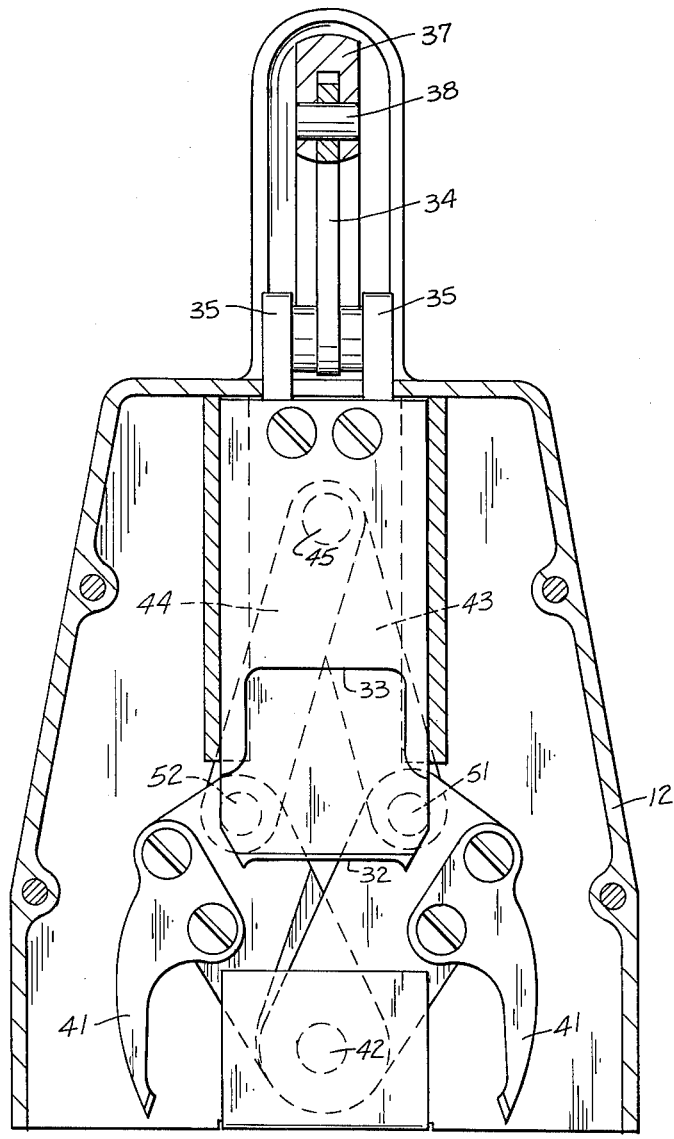
FIG. 11 is a sectional view of the device shown in FIG. 5, showing the adjustment mechanism for depth penetration in detail, with the fastener blind clenching members shown in retracted position and taken along lines 11—11 of FIG. 5.

As shown in FIGS. 5 and 10 wheel 27 has pivot 62 thereupon. Spring 63 is pivotally movable downwardly in the direction of the arrow shown in FIG. 5. Spring 63 also bears against teeth 62 at its forward end thereof. When wheel 27 moves in a clockwise direction it biases spring 63 downwardly and is therefore free to move. Therefore when belt 16 is pulled wheel 27 is free to move rotatably. However, since spring 63 bears against the teeth upon wheel 27, it holds wheel 27 against backlash motion and thus prevents slippage of belt 16.

As driver blade 32 is now moved downwardly it severs the leading fastener from the strip while former blade 33 forms the next fastener as shown in FIG. 18. This process is repeated as long as fasteners are to be driven.

As the fastener is driven by driver blade 32 the same movement also moves pin 45 downwardly and thereby causes linkages 43 and 44 to pivot so as to cause actuation of clenching members 41 thus clenching the fastener into position.

The foregoing sets forth the manner in which the objects of this invention are achieved.

Signed and sealed this 26th day of July 1966.

[SEAL]

Attest:
ERNEST W. SWIDER,
*Attesting Officer.*

EDWARD J. BRENNER,
*Commissioner of Patents.*